(12) United States Patent
Nordbruch et al.

(10) Patent No.: US 10,024,666 B2
(45) Date of Patent: Jul. 17, 2018

(54) METHOD AND APPARATUS FOR OPERATING A VEHICLE

(71) Applicant: Robert Bosch GmbH, Stuttgart (DE)

(72) Inventors: Stefan Nordbruch, Kornwestheim (DE); Carsten Hasberg, Ilsfed-Auenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/156,924

(22) Filed: May 17, 2016

(65) Prior Publication Data

US 2016/0342158 A1 Nov. 24, 2016

(30) Foreign Application Priority Data

May 22, 2015 (DE) .......... 10 2015 209 473

(51) Int. Cl.
| | |
|---|---|
| *G01C 21/00* | (2006.01) |
| *G05D 1/02* | (2006.01) |
| *G08G 1/00* | (2006.01) |
| *G08G 1/0967* | (2006.01) |
| *G08G 1/14* | (2006.01) |
| *G08G 1/16* | (2006.01) |

(52) U.S. Cl.
CPC .......... *G01C 21/00* (2013.01); *G05D 1/0274* (2013.01); *G08G 1/00* (2013.01); *G08G 1/096708* (2013.01); *G08G 1/096741* (2013.01); *G08G 1/096775* (2013.01); *G08G 1/143* (2013.01); *G05D 2201/0213* (2013.01); *G08G 1/166* (2013.01)

(58) Field of Classification Search
CPC ............ G01C 21/00; G05D 1/0274; G05D 2201/0213; G08G 1/096708; G08G 1/096741; G08G 1/096775; G08G 1/00; G08G 1/143; G08G 1/166
USPC ........................................... 701/23
See application file for complete search history.

(56) References Cited

U.S. PATENT DOCUMENTS

| | | | | |
|---|---|---|---|---|
| 9,120,484 | B1 * | 9/2015 | Ferguson | G05D 1/0055 |
| 9,600,768 | B1 * | 3/2017 | Ferguson | G06N 5/02 |
| 2011/0246156 | A1 * | 10/2011 | Zecha | G08G 1/166 |
| | | | | 703/6 |
| 2013/0197736 | A1 * | 8/2013 | Zhu | G05D 1/0088 |
| | | | | 701/26 |
| 2017/0227972 | A1 * | 8/2017 | Sabau | G05D 1/0295 |

* cited by examiner

*Primary Examiner* — Krishnan Ramesh
(74) *Attorney, Agent, or Firm* — Norton Rose Fulbright US LLP; Gerard Messina

(57) ABSTRACT

A method for operating a vehicle, including receiving a model of a real object and a position of the object via a communication network, ascertaining one or more object parameters based on the model received, and at least semi-autonomous guidance of the vehicle based on the one or more object parameters and the position. A corresponding apparatus, a method and an apparatus for providing driving-environment information, as well as a vehicle and a computer program, as also described.

10 Claims, 3 Drawing Sheets

METHOD AND APPARATUS FOR OPERATING A VEHICLE

CROSS REFERENCE

The present application claims the benefit under 35 U.S.C. § 119 of German Patent Application No. DE 102015209473.1 filed on May 22, 2015, which is expressly incorporated herein by reference in its entirety.

FIELD

The present invention relates to a method and an apparatus for operating a vehicle. The present invention also relates to a method and an apparatus for providing driving-environment information. In addition, the present invention relates to a vehicle, as well as a computer program.

BACKGROUND INFORMATION

Generally, vehicles having highly automated driver-assistance functions are able to drive automatically without a driver. A prerequisite for this is usually that a highly accurate map be available as basis for adequate and precise detection of the driving environment. Such highly accurate maps may be updated online. This, for example, is so that changes of roads, signposting, etc. are known.

Problematic with such highly accurate maps and online updating are, inter alia, the following points:
1. Usually a great deal of data is transmitted per object. For example, in addition to the position, it is also necessary to transmit size or dimensions, orientations, names/classifications and so forth. For instance, a classification may be that the object is classified as a signal transmitter. Consequently, great resources (memory requirements, bandwidths, . . . ) are usually needed, making industrialization difficult.
2. Accuracy, e.g., with regard to a contour of the object, may not be sufficient for the highly automated driver-assistance function.

SUMMARY

An object of the present invention is to provide an efficient solution, which permits improved implementation of an at least semi-autonomous driver-assistance function.

According to one aspect of the present invention, an example method is provided for operating a vehicle, including the following steps:
 receiving a model of a real object and a position of the object via a communication network,
 ascertaining one or more object parameters based on the model received,
 at least semi-autonomous guidance of the vehicle based on the one or more object parameters and the position.

According to another aspect of the present invention, an example apparatus is provided for operating a vehicle, including:
 a communication interface for receiving a model of a real object and a position of the object via a communication network,
 a processor for ascertaining one or more object parameters based on the model received and
 a control device for the at least semi-autonomous guidance of the vehicle based on the one or more object parameters and the position.

According to a further aspect of the present invention, an example method is provided for making driving-environment information available, based on which a vehicle is able to be guided at least semi-autonomously, including the following steps:
 ascertaining a model of a real object and a position of the object,
 transmitting the ascertained model together with the position as the driving-environment information via a communication network.

According to another aspect of the present invention, an example apparatus is provided for making driving-environment information available, based on which a vehicle is able to be guided at least semi-autonomously, including:
 a processor for ascertaining a model of a real object and a position of the object, and
 a communication interface for transmitting the ascertained model together with the position as the driving-environment information via a communication network.

According to another aspect of the present invention, an example vehicle is provided, including the apparatus for operating a vehicle.

According to a further aspect of the present invention, an example computer program is provided which includes program code to carry out the method for operating a vehicle and/or for making driving-environment information available, when the computer program is executed on a computer.

The present invention includes no longer transmitting data, which directly describes the real object, to the vehicle. Rather, according to example embodiments of the present invention, only a model of the real object is transmitted via the communication network, in particular, the model is transmitted to the vehicle via the communication network. Together with the model, a position of the real object is transmitted via the communication network. Since a model of a real object does not require as much memory as data which directly describes the real object in detail, less data therefore also has to be transmitted or sent via the communication network. Thus, an existing bandwidth is utilized efficiently. In particular, the memory space required is reduced.

The object parameters used for the at least semi-autonomous guidance may be determined easily and efficiently based on the model. Therefore, an efficient solution is provided, based on which, the vehicle is able to be guided at least semi-autonomously. Consequently, a semi-autonomous driver-assistance function based on the concept according to the present invention may thus be realized.

A position within the context of the present invention preferably has three coordinates: X, Y, Z according to a Cartesian coordinate system. Thus, even if, within the course of this description, a position should include only two coordinates, X, Y, a further specific embodiment to be read at the same time, in which the position has three coordinates: X, Y, Z.

The phrase "at least semi-autonomous" also includes the case of a fully-autonomous (which may also be referred to as autonomous) guidance. That means in particular that according to one specific embodiment, the vehicle is guided fully autonomously or autonomously. Thus, "at least semi-autonomously" includes "autonomously."

Autonomous for the purposes of the present invention means, in particular, that the vehicle navigates or drives independently, thus, without intervention by a driver. Hence, the vehicle is able to drive independently or automatically, without a driver having to steer the vehicle for this purpose.

In particular, guidance includes lateral guidance and/or longitudinal guidance of the vehicle.

According to one specific embodiment, based on the one or more object parameters and the position of the object, a digital object based on the real object is inserted into a digital map, the guidance being carried out based on the digital map. Namely, that means in particular that, for instance, a digital map is generated, which includes a digital object that is based on the real object. Since the position of the real object is known, the position of the digital object in the digital map may therefore also be determined. Because a digital map may thus be produced, in particular, this ensures the technical advantage of permitting improved guidance of the vehicle. Therefore, for example, a setpoint trajectory may be ascertained based on the digital map, the guidance including adjustment of an actual trajectory of the vehicle to the setpoint trajectory.

According to one specific embodiment, ascertainment includes that the one or more object parameters corresponding to the model are read out from a database in which a multitude of models of objects together with associated object parameters are stored. In particular, the technical advantage is thereby achieved, that the object parameters are able to be ascertained quickly and efficiently. According to one specific embodiment, such a database is available in the vehicle. That means namely that only the model must be transmitted to the vehicle. The relevant object parameters may then be ascertained based on the transmitted model. Therefore, details of the real object (thus, the object parameters) no longer have to be transmitted via the communication network to the vehicle. Consequently, an existing bandwidth may be utilized efficiently.

According to one specific embodiment, the model is a CAD model of the object. In this context, the abbreviation "CAD" stands for "Computer-Aided Design." This may be translated into German by "Rechnerunterstüztes Konstruieren." By utilizing a CAD model, the real object may be described in standardized fashion.

According to one specific embodiment, the model, especially the CAD model, is represented by an identification mark, e.g., an identification number. That is, the reception or the transmission of the model includes reception or transmission of the identification mark. Namely, that means in particular that the identification mark is transmitted or received. Because each model, particularly each CAD model, has its own unique identification mark, transmission of the identification mark is thus sufficient to identify the real object. In this manner, the volume of data transmitted may be reduced even further. Thus, for example, stored in the database is an assignment table that specifies which identification mark belongs to which model. Therefore, it is provided, for example, that only the identification mark is transmitted, thus sent, and therefore received. For instance, 128552354 is an identification number. An identification mark may, for instance, include alphabetic characters and/or special characters and/or numbers.

Consequently, according to one specific embodiment, the identification mark is received or sent with the position (thus, for example, with the coordinates X, Y, Z).

According to one specific embodiment, the one or more object parameters are elements from the following group of object parameters: size, especially length, height, width, mass, object type, e.g., signal transmitter, road marking, guardrail, traffic sign, house, vehicle, vehicle type, dimensions, orientation, contour, colors, special features.

Thus, in particular, according to one specific embodiment, one or more of the aforesaid object parameters are assigned to the model. That means in particular that, advantageously, it is thereby possible to very accurately describe how the real object is constituted.

Therefore, for instance, only the model "signal transmitter model ABC" at a position X, Y is transmitted. The exact dimensions of the signal transmitter are then read out from the database in the vehicle. That is to say, these exact dimensions themselves thus no longer have to be transmitted via the communication network.

According to one specific embodiment, the real object is a static object. In particular, a static object denotes an object which is not moving or cannot move. For instance, the static object is stationary infrastructure: For example, a guardrail, a signal transmitter, a road marking, a traffic sign or a house.

According to one specific embodiment, the real object is a dynamic object. A dynamic object denotes an object which is able to move or is moving. Thus, a vehicle is also a dynamic object even when it is parked, since it is able to move. In other words, for example, a dynamic object is thus a vehicle or a person or an animal.

According to one specific embodiment, several real objects are provided which, in particular, may be alike or different. That is to say, according to one specific embodiment, the concept of the present invention is expanded to several real objects. That means, for example, that several models of one real object each are thus received. Correspondingly, several models of one real object each are then transmitted via the communication network. The explanations in connection with one model of a real object hold true analogously for several models of one real object each, and vice versa.

According to one specific embodiment, the apparatus for operating a vehicle is designed or equipped to implement or carry out the method for operating a vehicle.

According to one specific embodiment, the apparatus for providing driving-environment information is designed or equipped to implement or carry out the method for providing driving-environment information.

Thus, in particular, the driving-environment information includes the model of the real object and the position of the real object. Namely, this driving-environment information is made available specifically via the communication network. This driving-environment information is especially made available to the vehicle via the communication network.

The present invention is explained in greater detail below on the basis of preferred exemplary embodiments.

DETAILED DESCRIPTION OF EXAMPLE EMBODIMENTS

Figure 1:
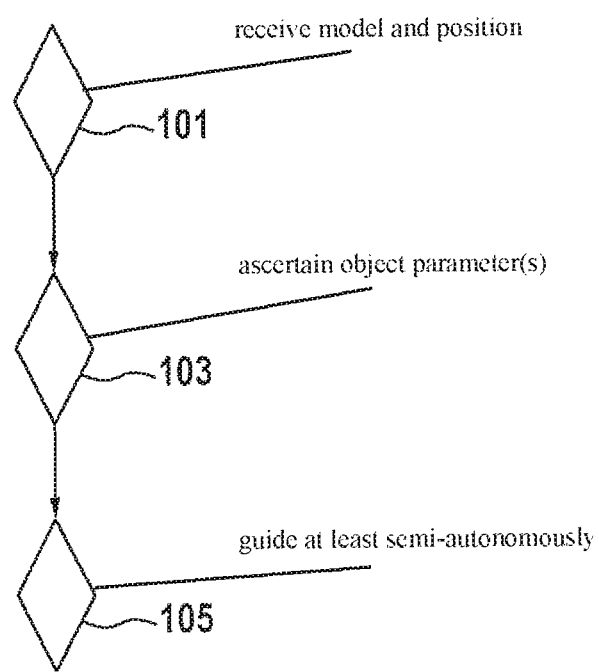
FIG. 1 shows a flowchart of an example method for operating a vehicle.

FIG. 1 shows a flowchart of an example method for operating a vehicle.

According to a step 101, a model of a real object and a position of the object are received via a communication network. For instance, the vehicle receives the model and the position.

In a step 103, one or more object parameters is/are ascertained based on the model received. Such object parameters are, e.g., a size, especially a length, a height, a width, of the real object. In particular, such an object parameter is a contour of the real object. According to one specific embodiment, these object parameters are read out from a database in which a multitude of models of objects together with associated object parameters are stored. That means, in particular, that only the model and the position must thus be transmitted via the communication network. For instance, a size of the real object no longer has to be transmitted via the communication network, because this size may be read out from the database. Consequently, less data has to be transmitted via the communication network. An existing transmission bandwidth of the communication network may therefore be utilized efficiently.

In a step 105, the vehicle is guided at least semi-autonomously, especially autonomously, based on the one or more object parameters and the position.

According to one specific embodiment, a digital map is produced or updated by inserting a digital object, which is based on the real object as well as the one or more object parameters, including the position of the object, into the digital map. The guidance is then carried out based on the digital map.

Consequently, a digital map may advantageously be updated by transmitting only models of real objects and associated positions of the real objects, which according to one specific embodiment, is provided in this way. The further necessary object parameters are then ascertained, e.g., read out from the database, and inserted in the form of the digital object into the digital map.

Figure 2:
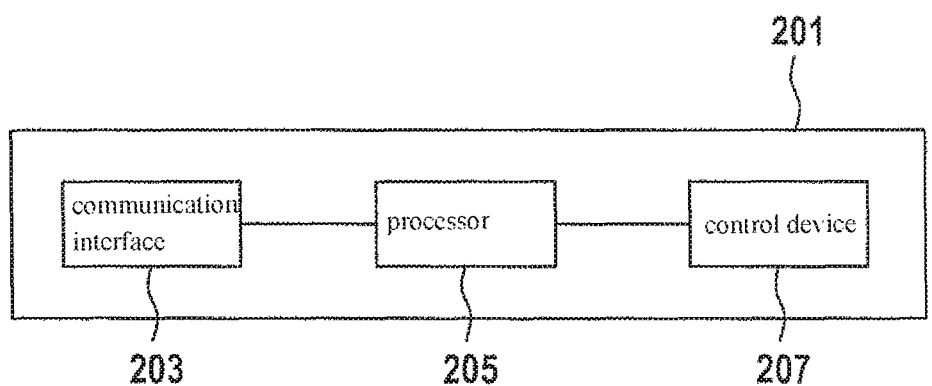
FIG. 2 shows an apparatus for operating a vehicle.

FIG. 2 shows an apparatus 201 for operating a vehicle.

Apparatus 201 includes a communication interface 203 for receiving a model of a real object and a position of the object via a communication network. Apparatus 201 includes a processor 205 for ascertaining one or more object parameters based on the model received. In addition, apparatus 201 includes a control device 207 for the at least semi-autonomous guidance, especially for the autonomous guidance, of the vehicle based on the one or more object parameters and the position.

Figure 3:
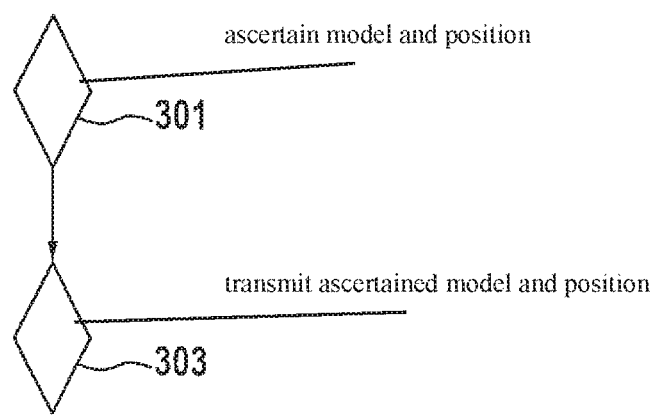
FIG. 3 shows a flowchart of a method for providing driving-environment information.

FIG. 3 shows a flowchart of a method for providing driving-environment information, based on which, a vehicle is able to be guided at least semi-autonomously.

In a step 301, a model of a real object and a position of the object are ascertained. In a step 303, the ascertained model together with the position is transmitted as the driving-environment information via a communication network, e.g., is transmitted to the vehicle.

According to one specific embodiment, the communication network includes a cellular network and/or a WLAN network.

In another specific embodiment, a communication via the communication network is encrypted.

Figure 4:
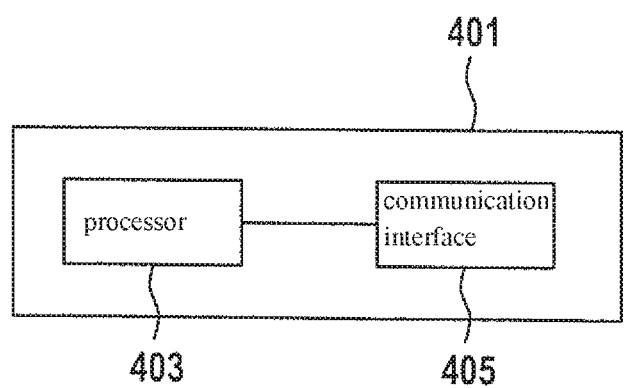
FIG. 4 shows an apparatus for providing driving-environment information.

FIG. 4 shows an apparatus 401 for providing driving-environment information, based on which, a vehicle is able to be guided at least semi-autonomously.

Apparatus 401 includes a processor 403 for ascertaining a model of a real object and a position of the object. Apparatus 401 includes a communication interface 405 for transmitting the ascertained model together with the position as the driving-environment information via a communication network.

According to one specific embodiment, the model is a CAD model of the real object.

Figure 5:
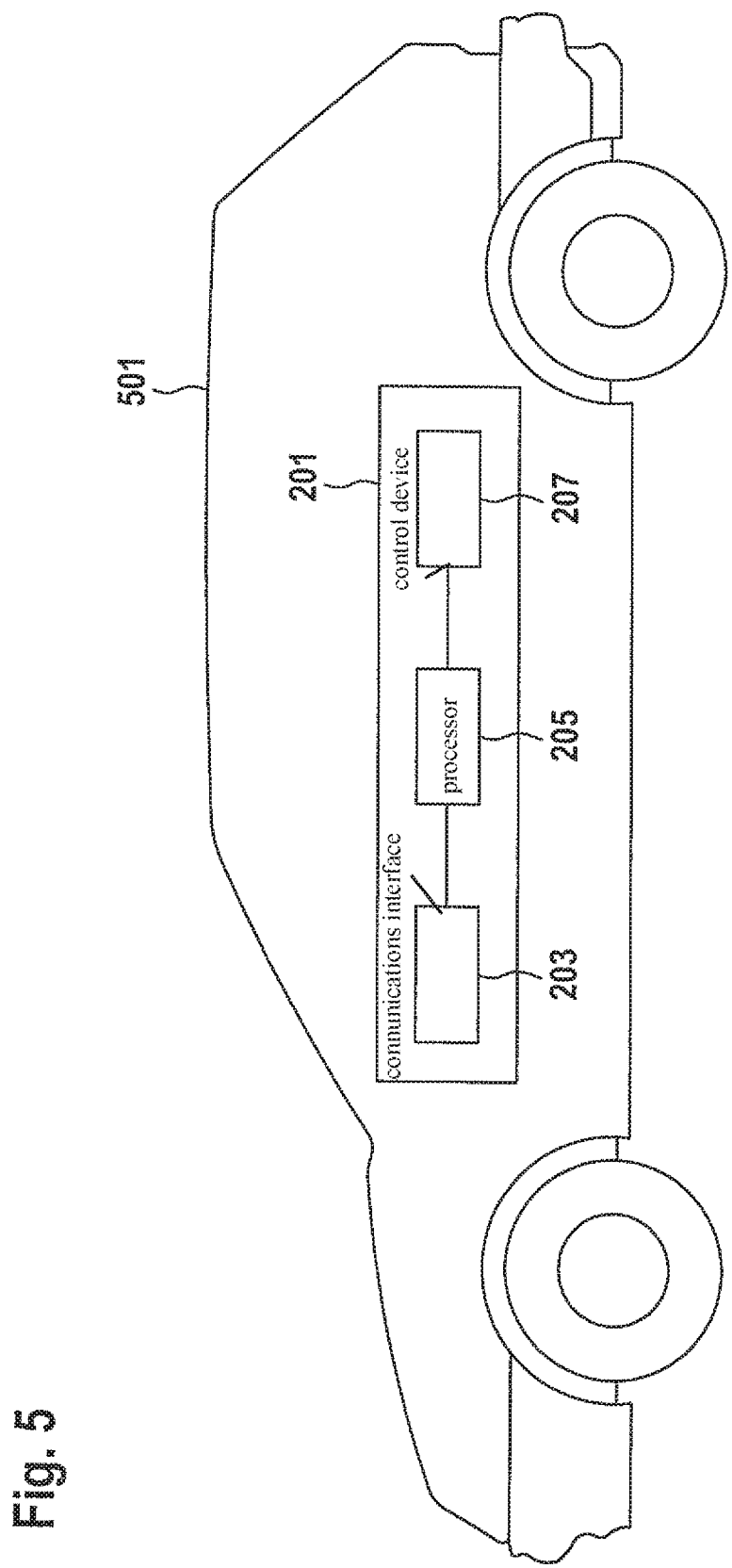
FIG. 5 shows a vehicle.

FIG. 5 shows a vehicle 501 including apparatus 201 of FIG. 2.

Thus, in particular and among other things, the present invention includes the idea of providing a technical concept by which, for example, the memory space required including necessary bandwidth may be reduced when transmitting data from a cloud map to the vehicle and back again. In particular, all specificities and all qualities of the data needed for the guidance are enhanced. Calculation and accuracy of the driving environment in particular are simplified in the vehicle. Calculation of the driving environment in the vehicle especially is shortened in terms of the time needed.

This is particularly because objects such as a signal transmitter, for example, road markings, guardrails, traffic signs or houses in the real world are described in the digital map by models, e.g., CAD models. For instance, these objects may be static objects and/or dynamic objects, e.g., vehicles. A model, especially a CAD model, specifically describes very precisely how the associated object is constituted (dimensions, orientation, contour, colors, special features). In other words, in particular, the model thus describes the associated real object.

According to one specific embodiment, the models, especially the CAD models, are stored in the vehicle as what are termed templates, especially in a database.

In transmitting a digital map, especially a digital cloud map, to the vehicle, thus especially in updating the digital map, according to one specific embodiment, only the model number, particularly the CAD model number, together with the position of the real object is transmitted or transferred to the vehicle. The dimensions, the contour, thus, the characteristics of the object (in general, the object parameters) are known as such, in particular, these special features or these characteristics are stored in the database. Thus, these characteristics no longer have to be transmitted via the communication network to the vehicle.

According to one specific embodiment, a transmission, for example, is as follows:

CAD model "signal transmitter-model ABC" or "Audi A8" at position X,Y.

In contrast, in the related art, the following is transmitted: Object with designation "signal transmitter" at position X,Y. Object has dimensions X,Y,Z and orientation W. A contour is described by the following parameters, if it is even possible or available based on a data volume. One or more colors of the object are red, green, yellow, for example. In particular, this has the disadvantage that a wide range of data must be transmitted to the vehicle.

In contrast, in accordance with the present invention, i.e., of transmitting only the model, it is possible to save on this data. The reason is that this data, which in the related art is still transmitted via the communication network to the vehicle, according to one specific embodiment, is stored in a database in the vehicle itself. Only the model, especially the CAD model, is transmitted, based on which, the object characteristics are able to be read out from the database.

Thus, the advantages indicated above (memory reduction, speeds, accuracy) are thereby able to be realized.

What is claimed is:

1. A method for operating a vehicle that includes a database that stores a plurality of models, wherein each of the models (a) corresponds to a respective type of real space object, (b) describes, using one or more object parameters, an appearance of the respective real space object to which the respective model corresponds, and (c) is assigned a respective unique identification code formed of an alphanumeric string that uniquely identifies the respective model without any description of the appearance of the respective real space object to which the respective model corresponds, the method comprising:

receiving, by a control unit of the vehicle, from a device that is external to the vehicle, and via a communication network, (a) one of the unique identification codes without any description of the appearance of the respective real space object whose appearance is described by the model to which the received unique identification code corresponds, and (b) an associated position; and responsive to the receipt of the data, the control unit:

retrieving from the database the model whose unique identification code has been received; and at least semi-autonomously guiding the vehicle based on (a) the description, in the retrieved model, of the appearance of the real space object to which the retrieved model corresponds and the received associated position.

2. The method as recited in claim 1, further comprising: inserting, by the control unit and into a digital map, a digital object that represents the real space object to which the retrieved model corresponds based on the one or more object parameters in the retrieved model and the received associated position, wherein the guiding is carried out based on the digital map.

3. The method as recited in claim 1, wherein the models are CAD models.

4. An apparatus for operating a vehicle, the apparatus comprising:

a communication interface to a communication network;
    a control device including a processor; and
    a database that is local to, and that is accessible by, the processor;

wherein:

the database stores a plurality of models;

each of the models (a) corresponds to a respective type of real space object, (b) describes, using one or more object parameters, an appearance of the respective real space object to which the respective model corresponds, and (c) is assigned a respective unique identification code formed of an alphanumeric string that uniquely identifies the respective model without any description of the appearance of the respective real space object to which the respective model corresponds; and the processor is configured to:

receive, from a device that is external to the vehicle and via the communication interface and the communication network, (a) one of the unique identification codes without any description of the appearance of the appearance of the respective real space object whose appearance is described by the model to which the received unique identification code corresponds, and (b) an associated position; and responsive to the receipt of the data:

retrieve from the database the model whose unique identification code has been received; and at least semi-autonomously guide the vehicle based on (a) the description, in the retrieved model, of the appearance of the real space object to which the retrieved model corresponds and the received associated position.

5. The apparatus as recited in claim 4, wherein the processor is designed to insert into a digital map a digital object that represents the real space object to which the retrieved model corresponds based on the one or more object parameters in the retrieved model and the received associated position, and carry out the guidance based on the digital map.

6. A vehicle comprising:

an apparatus for operating the vehicle, the apparatus including:

a communication interface to a communication network;
        a control device including a processor; and
        a database that is local to, and that is accessible by, the processor;

wherein:

the database stores a plurality of models;

each of the models (a) corresponds to a respective type of real space object, (b) describes, using one or more object parameters, an appearance of the respective real space object to which the respective model corresponds, and (c) is assigned a respective unique identification code formed of an alphanumeric string that uniquely identifies the respective model without any description of the appearance of the respective real space object to which the respective model corresponds; and the processor is configured to:

receive, from a device that is external to the vehicle and via the communication interface and the communication network, (a) one of the unique identification codes without any description of the appearance of the appearance of the respective real space object whose appearance is described by the model to which the received unique identification code corresponds, and (b) an associated position; and responsive to the receipt of the data:

retrieve from the database the model whose unique identification code has been received; and at least semi-autonomously guide the vehicle based on (a) the description, in the retrieved model, of the appearance of the real space object to which the retrieved model corresponds and the received associated position.

7. A non-transitory computer-readable storage medium storing a computer program that, when executed by a processor of a vehicle that includes a database that stores a plurality of models, causes the processor to perform a method for operating the vehicle, wherein each of the models (a) corresponds to a respective type of real space object, (b) describes, using one or more object parameters, an appearance of the respective real space object to which the respective model corresponds, and (c) is assigned a respective unique identification code formed of an alphanumeric string that uniquely identifies the respective model without any description of the appearance of the respective real space object to which the respective model corresponds the method comprising:

receiving, via communication network and from a device that is external to the vehicle, (a) one of the unique identification codes without any description of the appearance of the respective real space object whose appearance is described by the model to which the received unique identification code corresponds, and (b) an associated position; and responsive to the receipt of the data:

retrieving from the database the model whose unique identification code has been received; and at least semi-autonomously guiding the vehicle based on (a) the description, in the retrieved model, of the appearance of the real space object to which the retrieved model corresponds and the received associated position.

8. The method as recited in claim 1, wherein the one or more object parameters include one or more geometric object descriptors.

9. A method for operating a vehicle that includes a database that stores a plurality of models, wherein each of the models (a) corresponds to a respective type of real space object, (b) describes, using one or more object parameters, an appearance of the respective type of real space object to which the respective model corresponds, and (c) is assigned a respective unique identification code formed of an alphanumeric string that uniquely identifies the respective model without any description of the appearance of the respective type of real space object to which the respective model corresponds, the method comprising:

receiving, by a control unit of the vehicle, from a device that is external to the vehicle, via a communication network, and for each of a plurality of real space objects that are separate from the device and are of the respective type to which a single one of the stored plurality of models corresponds (a) the respective unique identification code of the single one of the stored plurality of models without any description of the appearance of any of the plurality of real space objects whose appearance is described by the single one of the stored plurality of models, and (b) a respective associated position; and responsive to the receipt of the data, the control unit:
retrieving from the database the model whose unique identification code has been received; and
at least semi-autonomously guiding the vehicle based on (a) the description, in the retrieved model, of the appearance of the respective type of real space object to which the retrieved model corresponds and the received associated positions.

10. An apparatus for operating a vehicle, the apparatus comprising:

a communication interface to a communication network;
a control device including a processor; and
a database that is local to, and that is accessible by, the processor;
wherein:
the database stores a plurality of models;
each of the models (a) corresponds to a respective type of real space object, (b) describes, using one or more object parameters, an appearance of the respective type of real space object to which the respective model corresponds, and (c) is assigned a respective unique identification code formed of an alphanumeric string that uniquely identifies the respective model without any description of the appearance of the respective type of real space object to which the respective model corresponds; and
the processor is configured to:
receive, from a device that is external to the vehicle, via the communication interface and the communication network, and for each of a plurality of real space objects that are separate from the external device and are of the respective type to which a single one of the stored plurality of models corresponds (a) the respective unique identification code of the single one of the stored plurality of models without any description of the appearance of any of the plurality of real space objects whose appearance is described by the single one of the stored plurality of models, and (b) a respective associated position; and
responsive to the receipt of the data:
retrieve from the database the model whose unique identification code has been received; and
at least semi-autonomously guide the vehicle based on (a) the description, in the retrieved model, of the appearance of the respective type of real space object to which the retrieved model corresponds and the received associated positions.

\* \* \* \* \*